Figure 1:
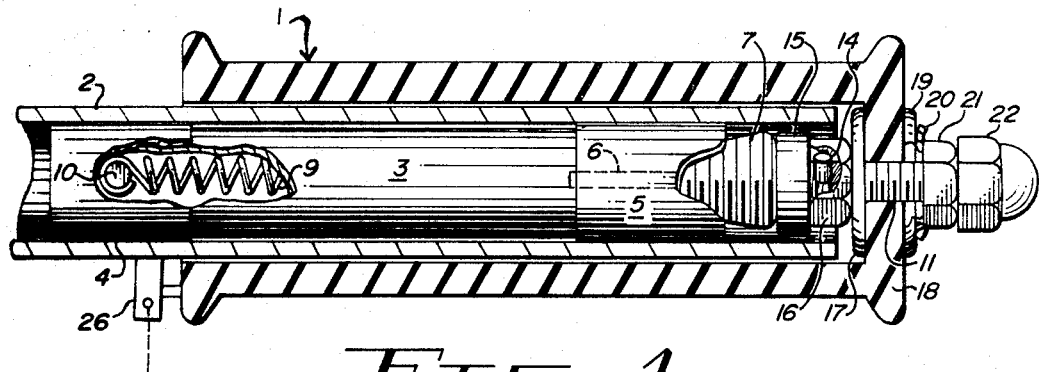

United States Patent [19]
Bartlett

[11] 3,752,006
[45] Aug. 14, 1973

[54] THROTTLE ASSIST MECHANISM FOR MOTORCYCLE

[76] Inventor: Charles M. Bartlett, 6613 E. Indian School Rd., Scottsdale, Ariz.

[22] Filed: July 24, 1972

[21] Appl. No.: 274,417

[52] U.S. Cl. ............................................... 74/489
[51] Int. Cl. .......................... G05g 1/08, G05g 7/00
[58] Field of Search ............................... 74/488, 489

[56] References Cited
UNITED STATES PATENTS

| | | | |
|---|---|---|---|
| 2,776,579 | 1/1957 | Nichel, Jr. | 74/488 |
| 2,788,676 | 4/1957 | Spexarth | 74/489 |
| 3,522,745 | 8/1970 | Milosevic | 74/489 |

*Primary Examiner*—Allan D. Herrmann
*Attorney*—William C. Cahill, James H. Phillips et al.

[57] ABSTRACT

In order to alleviate the torsional tension ordinarily required to be maintained constantly to hold a given motorcycle throttle opening, means are provided to apply a partially compensating torque in the opposite direction. The end of the motorcycle twist grip which the operator utilizes to control the throttle. A slightly expansible tubular member, dimensioned to fit within the handlebar, is provided with a tapered expander member for firmly securing the tubular member within the handlebar. A torsion spring within the tubular member is fixed thereto at a first end and is connected to a threaded shaft at its opposite end. The threaded shaft extends through and is fixed to the end of the twist grip, and means are provided for adjustably setting up the torque exerted by the torsion spring, which torque opposes that developed in the twist grip by the usual throttle return spring acting through the conventional cable to which the twist grip is operatively connected in the well known manner.

7 Claims, 2 Drawing Figures

Patented Aug. 14, 1973

3,752,006

THROTTLE ASSIST MECHANISM FOR MOTORCYCLE

This invention relates to the engine throttle control arts, and, more particularly, to apparatus for reducing the torque exerted by a throttle control spring on the throttle twist grip of a motorcycle.

As is very commonly known, the standard motorcycle twist grip throttle operates the motorcycle engine carburetor throttle setting by means of a cable which translates an angular change in the twist grip to a longitudinal movement. In order to insure prompt and accurate throttle reduction or release, it is necessary to provide one or more springs operating at the carburetor end of the cable, which springs tend to forcibly close the carburetor. It is against this spring means that the motorcycle operator must maintain his selected throttle setting by twisting the twist grip as necessary. Maintaining a steady throttle opening over an extended period of time can become very fatiguing, particularly with the more powerful motorcycles which may have a plurality of carburetors with a commensurate necessity for more powerful throttle return spring means.

It has been suggested that the throttle control springs can be simply weakened; however, it has been found that the return spring system cannot be sufficiently weakened to afford any effective relief to the operator while still maintaining satisfactory throttle closure action. Thus, those skilled in the art will appreciate the desirability of providing means for significantly reducing the torque necessary to maintain a selected throttle setting without in any way affecting the normal throttle return function when the twistgrip is closed.

It is therefore a broad object of my invention to provide apparatus for reducing the torque necessary to maintain a throttle opening by means of a twist grip without adversely affecting the normal throttle return action.

It is another object of my invention to provide such apparatus which is inherently safe by virtue of the point of counteracting torque application.

It is a still further object of my invention to provide such apparatus which is simple and easy to install on existing motorcycles and yet is reliable and durable in operation.

In another aspect, it is an object of my invention to provide such apparatus which may be readily adjusted as to the degree of assistance provided in order to satisfy the individual motorcycle operator.

Figure 2:
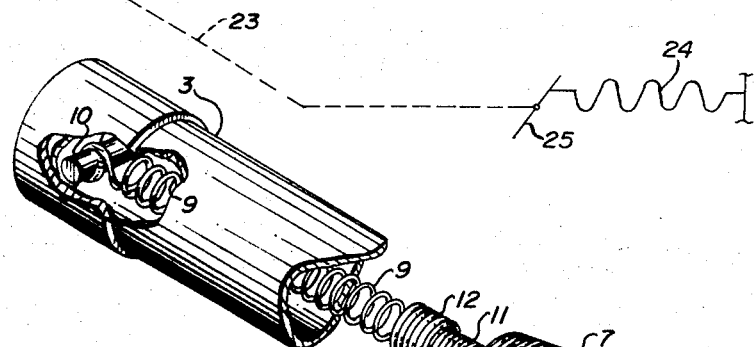
Figure 2:
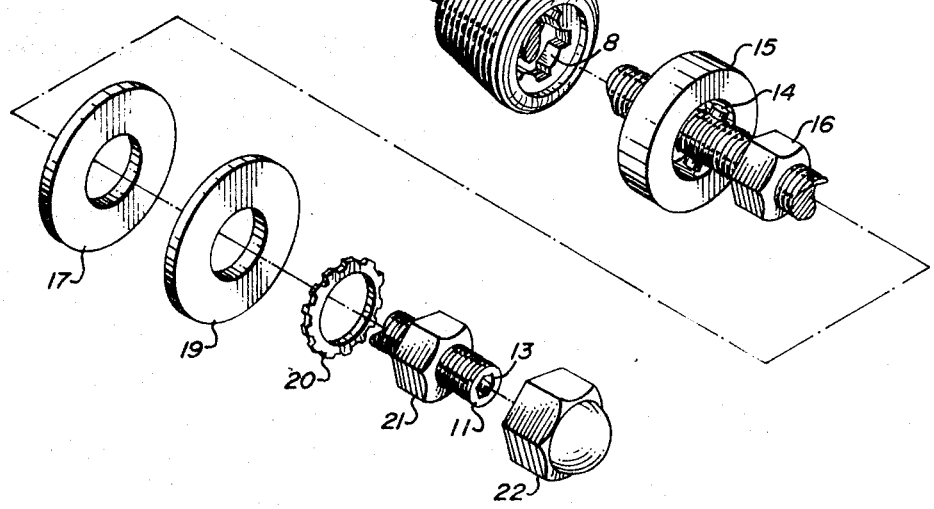

The subject matter of the invention is particularly pointed out and distinctly claimed in the concluding portion of the specification. The invention, however, both as to organization and method of operation, may best be understood by reference to the following description taken in connection with the accompanying drawing of which:

FIG. 1 is a partially cutaway, partial cross-sectional view of a throttle twist grip mounted on the end of a handlebar as my invention is incorporated therewith; and FIG. 2 is an exploded view illustrating in detail the various functional elements of the internal mechanism of my invention.

Referring now to FIG. 1, a twist grip 1 is observed to be mounted on the end of a handlebar 2 for rotation thereabout to alter the throttle 25 setting of a motorcycle through conventional cable means 23. Typically, the right hand twist grip is utilized to effect throttle control, and the throttle return spring 24, situated at the carburetor end of the throttle cable 23 tends to rotate the twist grip 1, through linkage 26, clockwise as viewed from the outboard end thereof. As will become more apparent as the description proceeds, the function of the present invention is to apply a torque in the opposite direction at the end of the twist grip 1 to partially counteract the torque applied through the conventional cable means 23.

Referring simultaneously to FIGS. 1 and 2, the various components of my invention will now be described to permit a more ready understanding of its manner of operation. A plastic tubular body 3 is wrapped at each end 4,5, thereof with several turns of a resilient tage such as electricians neoprene tape. The outboard end about which the type 5 is wrapped is provided with a pair of diametrically opposed longitudinal slots 6 of which only one is in view in FIG. 1. The slots 6 permit slight radial expansion of the outboard end of the tubular body 3 for reasons which will become more apparent as the description of the apparatus proceeds. The outboard end of the plastic tubular body 13 is provided with internal threads to receive tapered expander 7 which is correspondingly externally threaded. The tapered expander 7 has several notches 8 disposed in a countersunk portion of the outboard end thereof.

A torsion spring 9 is fixed at its inboard end to an anchor pin 10 which passes through the walls of the tubular body 3 proximate the inboard end thereof. The outboard end of the torsion spring 9 is fixed to a thread shaft 11 by any convenient means such as an epoxy joint 12. The outboard end of the threaded shaft 11 is provided with a coaxially hexagonal opening 13 for receiving the well known Allen wrench. There are, of course, well known variations from the Allen wrench configuration which achieve the same purpose. A pin 14 extends diametrically through the threaded shaft 11 and protrudes slightly on each side thereof sufficiently to engage the notches 8 of the tapered expander 7 during assembly of the apparatus as will be explained below.

Coaxially disposed serially outboard the tapered expander 7 are a plastic spacer 15 having an inside diameter sufficient to clear the pin 14, a countersunk nut 16 with the countersunk portion thereof also sufficient to accomodate the protruding ends of the pin 14, a first washer 17, the end 18 of the twist grip, a second washer 19, a lock washer 20, an assembly tightening nut 21, and a cap nut 22.

The manner in which the apparatus of the present invention is incorporated into a motorcycle throttle control assembly is as follows. After the appropriate twist grip has been removed from the motorcycle handlebar, the plastic tubular body is inserted into the opening end of the handlebar with the taped ends 4 and 5 adjusted by selectively removing enough of the tape to achieve a moderately snug fit in the handlebar. The tubular body 3 is then removed from the handlebar, and the tapered expander 7 is started into the threaded outboard end of the tubular body 3. The assembly to that point is then reinserted into the end of the handlebar until the outboard end of the tapered expander 7 is approximately three-sixteenths inches inside the handlebar. In order to securely lock the tubular body 3 into place within the handlebar, an Allen wrench is fitted into the hexagonal opening 13 in the outboard end of the threaded shaft 11, and the threaded shaft 11 is pushed inwardly therewith until the pin 14 engages one pair of the notches 8 in the tapered expander 7. The expander 7 may then be tightened to spread the outboard end of the tubular body 3 slightly to lodge the assembly in place. The tightening of the tapered expander 7 is preferably carried out using several short turns, disengaging the pin 14 from the notches 8 between turns thereby preventing possible distortion of the torsion spring 9.

After the tubular body 3 has been fixed within the handlebar 2, the plastic spacer 15 is inserted onto the shaft 11 and passed over the pin 14 after which the countersunk nut 16 may be threaded onto the shaft and tightened snugly against the pin, in which position the countersink covers the pin 14. The washer 17 is then placed into position and the twist grip 1 replaced by pushing the end 18 thereof over the threaded shaft. It may, of course, be necessary to provide an appropriate opening in the end 18 of the twist grip 1 to receive the shaft. Then the second washer 19, the locking washer 20, and the assembly tightening nut 21 are introduced on the shaft without, however, tightening the nut. Holding the twist grip 1 in the throttle closed position, an Allen wrench fitted to the opening 13 is utilized to turn the threaded shaft 11 a predetermined amount, such as three full turns, clockwise to bias the torsion spring 9. With the assembly held in this position, the assembly tightening nut 21 is tightened to firmly lock the shaft 11 in position. The cap nut 22 may then be fitted to the end of the threaded shaft 11 for purposes of appearance and safety.

The effect of applying the counter-clockwise torsional bias to the end of the twist grip 1 manifestly reduces the effort necessary to increase or hold a given throttle setting. Nonetheless, if the throttle cable breaks, as often happens, the full return force generated by the carburetor spring assembly allows the throttles to close normally which is a significant safety factor unobtainable with any throttle assist apparatus acting at the carburetor end of the throttle control system.

Once the trail adjustment has been tested in actual use, the operator may desire more or less counteracting torque, which adjustment can readily be made by removing the cap nut 22, inserting an Allen wrench into the hexagonal opening 13 at the end of the shaft 11, and loosening the assembly tightening nut 21 after which the shaft 11 may be readjusted angularly while the twist grip 1 is held in the throttle closed position. Thereafter, the nut 21 may be retightened and the cap nut 22 refitted in the obvious manner.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. Apparatus for partially counteracting the torque exerted on the throttle twistgrip of a motorcycle by the conventional throttle return means comprising:
   a. torsion spring means disposed within a handlebar of said motorcycle proximate a handlebar end about which the throttle twistgrip rotates;
   b. means for securing a first end of said torsion spring means against rotation with respect to said handlebar;
   c. shaft means fixed to a second end of said torsion spring, said shaft means extending outwardly, generally coaxial with said handlebar end and terminating beyond said handlebar end;
   d. means fixing said shaft to an outboard end of the throttle twistgrip, concentric with a longitudinal body portion thereof; and
   e. means for biasing said torsion spring whereby a compensating torque is exerted by said shaft on the throttle twistgrip outboard end, said compensating torque being opposite in direction to the torque derived from the motorcycle throttle return means.

2. The apparatus of claim 1 which further includes means for adjusting the bias of said torsion spring such that a predetermined compensating torque is present with the throttle twistgrip in the closed position.

3. The apparatus of claim 2 which includes:
   a. a tubular housing dimensioned to fit snugly within said handlebar end; and
   b. expansion means for rigidly securing said tubular housing to said handlebar end by frictional engagement with the inner surface thereof; and means for anchoring said first end of said torsion spring within said tubular housing.

4. The apparatus of claim 3 in which said expansion means includes a tapered expander adapted to threadably engage the interior of the outboard end of said tubular housing whereby said outboard end of said housing expands radially to frictionally engage the inner surface of said handlebar end as said tapered expander is screwed into said tubular housing.

5. The apparatus of claim 4 in which said shaft is threaded along at least an outboard portion of its length, said threaded portion extending through a central aperture in said outboard end of the throttle twistgrip, and said means for fixing said shaft to said outboard end of the throttle twistgrip comprises:
   a. an inboard nut threaded onto said shaft;
   b. an inboard washer disposed between said inboard nut and an inboard surface of said outboard end of the throttle twistgrip;
   c. an outboard nut threaded onto said shaft; and
   d. an outboard washer disposed between said outboard nut and an outboard surface of said outboard end of the throttle twistgrip
   whereby tightening said outboard nut squeezes said washers into frictional engagement with said outboard end of the throttle twistgrip.

6. The apparatus of claim 5 in which said tapered expander includes a plurality of diametrically opposed notches about the inner periphery of its outboard end, and further including a pin extending diametrically through said shaft, said notches being dimensioned to engage said pin, the normal position of said pin just outboard said tapered expander whereby longitudinal pressure against the outboard end of said shaft engages said pin with said notches such that said shaft may be rotated to screw said tapered expander into said outboard end of said tubular housing.

7. The apparatus of claim 6 in which said tubular housing is provided with diametrically opposed longitudinal slots at the outboard end thereof to facilitate radial expansion without longitudinal splitting as said tapered expander is screwed in.

* * * * *